Dec. 6, 1932.　　　J. G. BARBER　　　1,890,357
VALVE OR COCK
Filed Sept. 30, 1931

INVENTOR
James G. Barber.
BY
William C. Linton.
ATTORNEY

Patented Dec. 6, 1932

1,890,357

UNITED STATES PATENT OFFICE

JAMES GRESHAM BARBER, OF MILL HILL, LONDON, ENGLAND

VALVE OR COCK

Application filed September 30, 1931, Serial No. 566,151, and in Great Britain February 9, 1931.

This invention relates to valves or cocks of the screw down lift valve type for domestic or household use.

Various proposals have been made to cover the usual metal taps for domestic and like use with some non-metallic material, but so far as I am aware, no satisfactory covered tap has been produced.

The object of this invention is to provide an improved construction of covered metal tap whereby the covering will not chip off or disintegrate.

To this end, the valve assembly of a metal tap for domestic and like use, is covered with a previously moulded covering of non-metallic material, for example, mouldable material known under the registered trade mark "Bakelite"; material composed of one of the phenol-formaldehyde condensation products or syntheses of same, or any other similar material.

The valve assembly of the metal tap may be of any known construction, and the moulded covering for the valve body, valve stem and the usual angularly movable knob or handle, may be formed in three or more portions, the valve stem portion being screwed or otherwise secured on to the valve body portion.

The nozzle or outlet may be formed in one with the cover for the valve body and composed of moulded material only, that is, no metal liner being provided.

Figure 1:
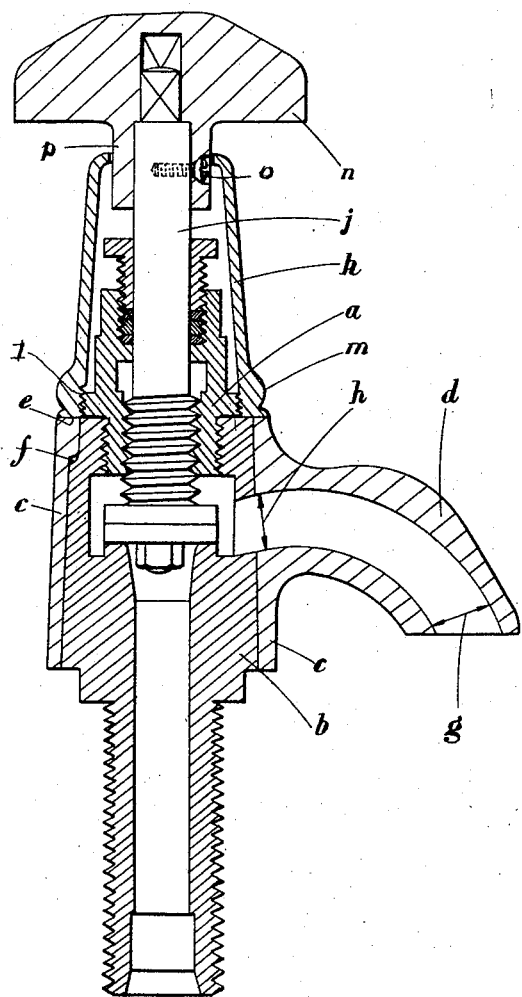
Figure 2:
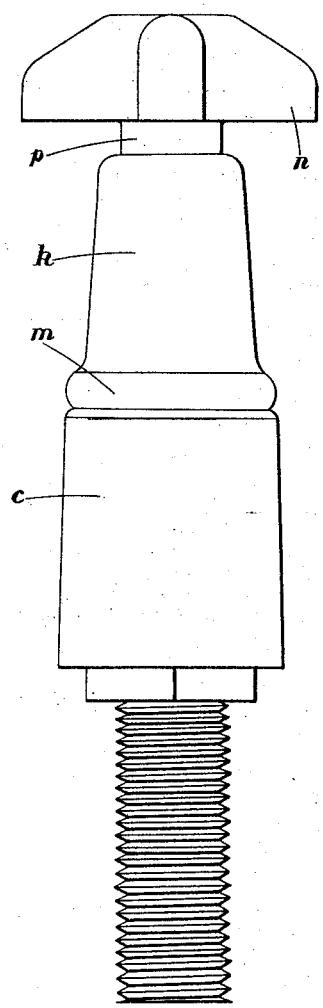

The invention will now be described with reference to the accompanying drawing in which Figure 1 is a sectional elevation of one form of tap constructed in accordance with this invention, and Figure 2 is an end elevation thereof.

$a$ is the valve assembly of a "Pillar" cock without the nozzle, and is composed of metal, preferably brass. The valve body $b$ which is tapered, is surrounded by a previously moulded covering $c$ composed of "Bakelite" or similar non-metallic material. Formed in one with the said covering $c$ is the nozzle or outlet $d$. The said covering $c$ is pushed on to the metal body $b$ and is prevented from angular movement thereon by means of the integral key $e$ which enters the groove $f$ in the body $b$.

In order that the nozzle $d$ may be moulded satisfactorily, the centre line of the internal bore or passage should be an arc of a circle and the bore at $h$ should be of smaller diameter than at $g$.

By carrying out the above, the insert or core can be removed easily without any danger of fracturing the moulded material.

The valve stem $j$ is surrounded by a truncated cone shaped covering $k$ open at both ends. The lower end of said covering is internally threaded at $l$ so that it can be screwed to the valve assembly $a$. The exterior of the covering $k$ is formed with a flange $m$ to facilitate assembly thereof.

$n$ is a knob attached to the valve stem $j$ by means of the screw $o$. The knob $n$ is formed with a downwardly protruding cylindrical flange $p$ extending into the valve stem covering $k$.

Although the three portions $c$, $k$, $n$ cover the valve assembly, they are not attached to one another, each portion itself being connected to the metal assembly.

Other well known types of taps may be covered in a similar manner by previously moulded portions attached to the metal valve assembly.

With a tap covered with previously moulded material, there is no risk of fracture of the moulded material due to unequal contraction or expansion of the metallic and non-metallic parts during the process of manufacture.

What I claim is:

1. A valve or cock of the screw down lift valve type for domestic or household use, wherein the metal assembly thereof is covered by a previously moulded covering of non-metallic material, said covering consisting of a plurality of parts each of which is attached to the metal valve assembly, the nozzle or outlet being formed in one with the part covering the valve body of the assembly and consisting solely of moulded material.

2. A valve or cock of the screw down lift valve type for domestic or household use, wherein the metal assembly thereof is covered by a previously moulded covering of non-metallic material, said covering consisting of a plurality of parts each of which is attached to the metal valve assembly, the nozzle or outlet being formed in one with the part covering the valve body of the assembly and consisting solely of moulded material, the bore of the said nozzle being of less diameter at its inner extremity than that at its outer extremity.

In testimony whereof he affixes his signature.

JAMES GRESHAM BARBER.